(12) United States Patent
Rowbut et al.

(10) Patent No.: US 8,714,602 B2
(45) Date of Patent: May 6, 2014

(54) LOCKING DEVICE FOR LOCKING A STRUCTURAL ELEMENT AGAINST AN ADJACENT STRUCTURE, AN AIRCRAFT PROVIDED WITH SAID DEVICE, AND AN EXTRACTION METHOD IMPLEMENTED BY SAID DEVICE

(75) Inventors: Alexander Rowbut, Aix en Provence (FR); Cedric Cristiano, Calas (FR); Xavier Koetzel, Fos sur Mer (FR)

(73) Assignee: Eurocopter, Marignane Cedex (FR)

( * ) Notice: Subject to any disclaimer, the term of this patent is extended or adjusted under 35 U.S.C. 154(b) by 275 days.

(21) Appl. No.: 13/008,100

(22) Filed: Jan. 18, 2011

(65) Prior Publication Data

US 2011/0174929 A1 Jul. 21, 2011

(30) Foreign Application Priority Data

Jan. 21, 2010 (FR) ...................................... 10 00223

(51) Int. Cl.
*E05C 19/10* (2006.01)
(52) U.S. Cl.
USPC .......................................................... 292/95
(58) Field of Classification Search
CPC . E05B 53/003; E05B 13/002; E05B 17/0025; E05B 73/0017
USPC ....... 292/95, 113, 69, 256, DIG. 31, DIG. 65, 292/DIG. 49, 108, 210, 297, 56, 109, 240, 292/194, 198, DIG. 27
See application file for complete search history.

(56) References Cited

U.S. PATENT DOCUMENTS

| | | | | |
|---|---|---|---|---|
| 2,712,955 | A | * | 7/1955 | Andrews ........................ 292/113 |
| 2,894,777 | A | * | 7/1959 | Hogan ........................... 292/113 |
| 3,259,411 | A | * | 7/1966 | Griffiths ........................ 292/113 |
| 3,515,422 | A | | 6/1970 | Poe |
| 4,053,177 | A | * | 10/1977 | Stammreich et al. ......... 292/113 |
| 4,318,557 | A | * | 3/1982 | Bourne et al. ................ 292/113 |
| 4,320,912 | A | * | 3/1982 | Grace et al. .............. 292/341.18 |
| 4,538,843 | A | * | 9/1985 | Harris ............................ 292/113 |
| 4,768,815 | A | * | 9/1988 | Harmon ........................ 292/113 |
| 5,620,212 | A | * | 4/1997 | Bourne et al. ................ 292/113 |
| 5,984,382 | A | * | 11/1999 | Bourne et al. ................ 292/113 |
| 6,343,815 | B1 | * | 2/2002 | Poe ............................... 292/113 |

FOREIGN PATENT DOCUMENTS

| | | |
|---|---|---|
| FR | 1591218 A | 4/1970 |
| FR | 2458656 A1 | 1/1981 |
| FR | 2475104 A1 | 8/1981 |
| FR | 2857400 A1 | 1/2005 |

OTHER PUBLICATIONS

French Search Report and Written Opinion, Application No. FR 10 00223, filed Sep. 30, 2010.

* cited by examiner

*Primary Examiner* — Kristina Fulton
*Assistant Examiner* — Nathan Cumar
(74) *Attorney, Agent, or Firm* — Brooks Kushman P.C.

(57) ABSTRACT

The present invention relates to a locking device provided with a latch (10) and a retaining pin (100), said latch (10) having a handle (11) and a locking arm (20) hinged to said handle (11) by a pivot peg (13). The retaining pin (100) comprising a first transverse branch (101) and a second transverse branch (102) separated by a space (103), a second end (22) of said locking arm (20) has a contact finger (23) provided with a first surface and with a second surface (25) opposite from said first surface (24), said first surface (24) comprising closure means for co-operating with said first transverse branch (101), said second surface (25) comprising extractor means of said latch (10) for co-operating with said second transverse branch.

13 Claims, 2 Drawing Sheets

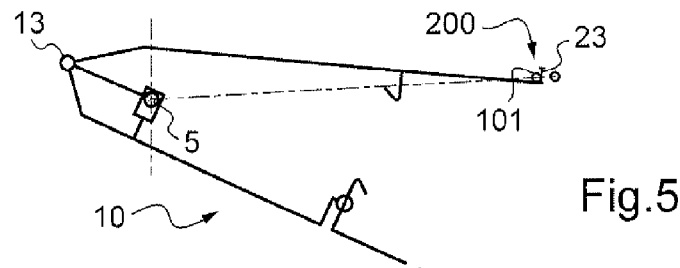
Fig.5
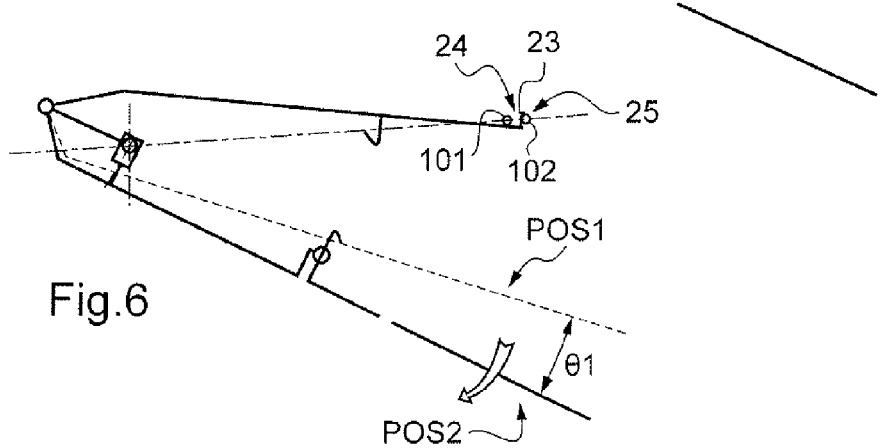
Fig.6
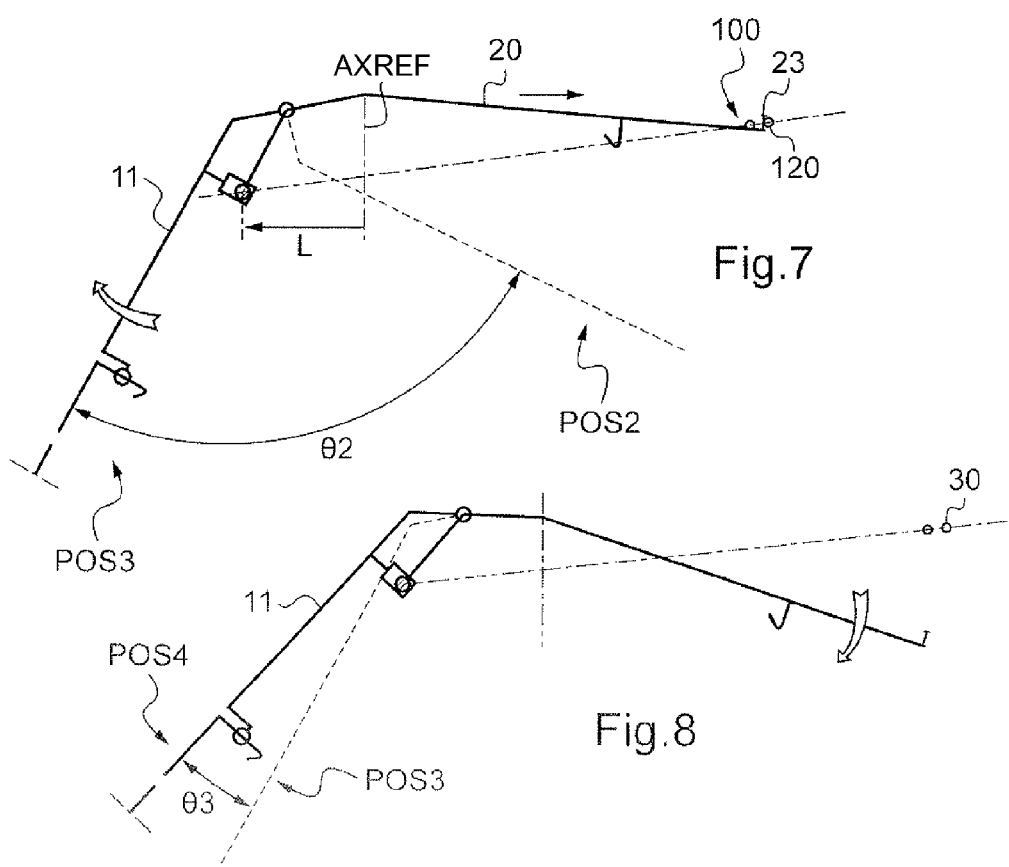
Fig.7
Fig.8

LOCKING DEVICE FOR LOCKING A STRUCTURAL ELEMENT AGAINST AN ADJACENT STRUCTURE, AN AIRCRAFT PROVIDED WITH SAID DEVICE, AND AN EXTRACTION METHOD IMPLEMENTED BY SAID DEVICE

CROSS REFERENCE TO RELATED APPLICATIONS

This application claims the benefit of FR 10 00223 filed on Jan. 21, 2010. The disclosure of which is incorporated in its entirety by reference herein.

FIELD OF THE INVENTION

The present invention relates to a locking device for locking a structural element against an adjacent structure, to an aircraft provided with said device, and to an extraction method implemented by said device.

The invention is situated in the technical field of means for locking and extracting a structural element, and more particularly but not exclusively of means for locking and extracting sliding covers of an aircraft of the rotorcraft type.

BACKGROUND OF THE INVENTION

Conventionally, a rotorcraft, and in particular a helicopter, has a fuselage provided with covers that are fastened to an adjacent structure by a locking device, each cover being suitable for being moved to provide an operator with access to internal members of the rotorcraft. In order to be opened, the covers may move in rotation about a fastener axis, or they move in translation. For example, an operator may have access to the engine compartment by causing a cover to slide.

Documents FR 1 591 218, FR 2 475 104, and FR 2 458 656 describe locking devices.

Document FR 2 458 656 discloses in particular a locking device having a latch arranged on the cover for fastening against an adjacent structure.

That latch is provided with a handle that is hinged about a fastener pin. A locking arm having a free end in the form of a rounded hook is connected to the handle by a pivot peg. When the handle and the locking arm are in a closed position, i.e. a flush position, the handle and the locking arm are connected by a tiltable release catch, the release catch being arranged on the handle and co-operating with a catch stud of the locking arm.

The locking device also includes a retaining pin disposed on the adjacent structure to which the cover is to be fastened.

In the closed position, the hook of the locking arm co-operates with a single transverse branch of the retaining pin.

When the operator seeks to open the cover, the operator causes the release catch to tilt, with the handle thus being released from the locking arm. The operator then tilts the handle, causing it to rotate about the fastener pin. This leads to rotary movement of the locking arm hook, which moves directly out from the retaining pin. The locking device is then in the open position and the operator can move the cover.

In a variant, the fastener pin is arranged inside an oblong hole in the handle, and a single compression link connects said fastener pin to the pivot peg.

Thus, if the release catch opens accidentally in flight, the handle turns through a minimum distance and does not lead to the hook separating from the single transverse branch of the retaining pin.

The presence of the oblong hole and of the compression link causes the pivot peg, the fastener pin, and the point of contact between the hook and the sole transverse branch of the retaining pin to be moved out of alignment. This results in jamming that prevents the locking device opening completely.

Reference may be made to the literature to obtain additional information about this safety feature.

Those locking devices are effective and have been in widespread use in the field of aviation for a long time.

Nevertheless, sliding covers often present large dimensions and they need to be fastened sufficiently securely so that they do not open under the effect of the aerodynamic forces to which they are subjected in flight. Under such circumstances, in order to be held in the closed position while in flight, sliding covers include not only latches, but also holding fingers, also known as "centering" fingers, that are arranged around the periphery of the sliding cover.

In a variant, the centering fingers may be secured to adjacent structures to which the cover needs to be fastened in flight, the cover then possessing means for receiving said centering fingers.

Unfortunately, manufacturing tolerances often give rise to high levels of friction between each centering finger and the corresponding reception means.

Under such circumstances, when the locking devices are opened, the operator has great difficulty in causing the cover to slide. Grip means have therefore been provided on covers to enable the operator to take hold thereof and open the cover. In spite of such grip means, it can be difficult to cause the cover to slide along the centering fingers.

It should be observed that the person skilled in the art of cold storage chambers is confronted with a door opening problem, since the door of a cold chamber tends to remain stuck to the door jamb.

To remedy that problem, a handle is known that is connected to the door via a hinge connection and that co-operates via a first end by interfering shapes with a section of the door jamb. In addition, the handle is extended by a pusher.

When the operator moves the handle, the handle turns about the connection zone with said door jamb section until the pusher comes into contact with the wall supporting the door jamb. This gives a considerable lever arm that enables the operator to unstick the door.

The first end is then disengaged from the door jamb and the operator can open the door without difficulty.

Nevertheless, although of interest, it will be understood that the technical field of doors for cold storage chambers is remote from the invention and cannot be easily adapted to covers, and in particular sliding covers. This observation is particularly true for an aircraft cover that requires a latch to be implemented that is flush, i.e. that does not project from the cover, for obvious aerodynamic reasons.

SUMMARY OF THE INVENTION

An object of the present invention is thus to provide a locking device that enables the extraction problem to be solved, the locking device also performing the function of extracting the centering fingers.

According to the invention, a locking device for locking a structural element, such as a cover, to an adjacent structure is provided with a latch suitable for being arranged on the structural element and with a retaining pin suitable for being arranged on the adjacent structure, the latch comprising firstly a handle having an oblong orifice in which there is inserted a fastener sleeve fastening it to the structural element, and secondly a locking arm having a first end hinged to the handle via a pivot peg, the handle including a release catch suitable for preventing the handle from tilting relative to the locking arm. The structural element may be a sliding structural element, such as a sliding cover.

This device is remarkable in that the retaining pin has first and second transverse branches that are separated by a space, a second end of the locking arm has a contact finger having on either side a first surface facing the first end and a second surface opposite from the first surface so that they look in opposite directions, the first surface constituting closure means that co-operate with the first transverse branch in a closed position of the latch to lock the locking device, the second surface constituting latch extractor means that co-operate with the second transverse branch in a latch extraction position to move the latch longitudinally away from the retaining pin, the contact finger then being outside the space in a latch open position so as to unlock the locking device.

Thus, contrary to the state of the art, the latch is provided with closure means and with extractor means.

For example, a first surface of the hook of document FR 2 458 656 co-operates with a single transverse branch in order to lock the device. In contrast, the retaining pin does not possess a second transverse branch that co-operates with a second surface of the hook in order to extract the latch.

The invention performs such a function by enabling the locking arm to move in a novel manner. The extraction that results therefrom enables a cover to be disengaged from centering fingers so as to facilitate the work of an operator seeking to make the cover slide.

In order to lock the device, the handle is moved so as to direct the contact finger into the space and press the first surface against the first transverse branch. Initially, the first surface tends to exert a force on the first transverse branch in order to move the latch closer to the retaining pin, and then the first surface locks the locking device in a closed position.

The locking device may also include one or more of the following characteristics.

Thus, the second surface optionally has a plane portion suitable for being in contact with the second transverse branch.

By way of example, the contact finger is a bar, the first and second surfaces being substantially parallel to each other. The first structure may nevertheless be rounded so as to optimize its co-operation with the first transverse branch.

Furthermore, the device may include an inclined plane suitable for guiding the contact finger towards the space while the device is being locked. This facilitates locking of the device.

In addition, the locking arm includes a groove co-operating with the fastener sleeve in order to limit the overall size of the latch when the device is locked.

In another aspect, the latch includes a compression link connecting the sleeve to the pivot peg.

Finally, the locking arm includes a catch stud between a first end and a second end of the locking arm, and the release catch co-operates with the catch pin of the locking arm to prevent the handle from tilting when the device is locked.

Furthermore, the invention also provides an aircraft provided with a structural element for fastening to an adjacent structure using at least one locking device. The structural element may be a sliding structural element, such as a sliding cover. The locking device is provided with a latch arranged on the structural element and with a retaining pin arranged on the adjacent structure, the latch comprising firstly a handle having an oblong orifice in which there is inserted a fastener sleeve fastening it to the structural element, and secondly a locking arm having a first end hinged to the handle via a pivot peg, the handle including a release catch suitable for preventing the handle from tilting relative to the locking arm. The aircraft is then remarkable in that the locking device is a device of the invention, as described above.

In addition to a locking device and an aircraft fitted with such a device, the invention provides an unlocking method implementing the locking device.

Thus, the invention provides a method of unlocking a structural element fastened to an adjacent structure by at least one locking device and provided with a latch arranged on the structural element and a retaining pin arranged on the adjacent structure, the latch comprising firstly a handle having an oblong orifice in which there is inserted a fastener sleeve fastening it to the structural element, and secondly a locking arm having a first end hinged to the handle via a pivot peg, the handle including a release catch suitable for preventing the handle from tilting relative to the locking arm, the retaining pin comprising first and second transverse branches that are separated by a space, a second end of the locking arm including a contact finger having on either side a first surface facing the first end and a second surface opposite from the first surface, the first surface constituting closure means that co-operate with the first transverse branch to lock the locking device. The method is remarkable in particular in that it comprises the following steps:

moving the release catch to separate the handle from the locking arm;

moving the handle through a first angular sector to press the second surface against the second transverse branch;

moving the handle through a second angular sector so that the second surface exerts a force on the second transverse branch in order to move the structural element away from the adjacent structure; and moving the handle through a third angular sector so as to extract the contact finger from the space.

It should be observed that the structural element may be a sliding structural element, such as a sliding cover.

BRIEF DESCRIPTION OF THE DRAWINGS

The invention and its advantages appear in greater detail from the following description of an embodiment given by way of illustration with reference to the accompanying figures, in which:

FIGS. 3 to 8 are figures for explaining the unlocking method implemented by the locking device.

Elements that are present in more than one of the figures are given the same references in each of them.

DETAILED DESCRIPTION OF THE PREFERRED EMBODIMENT

Figure 1:
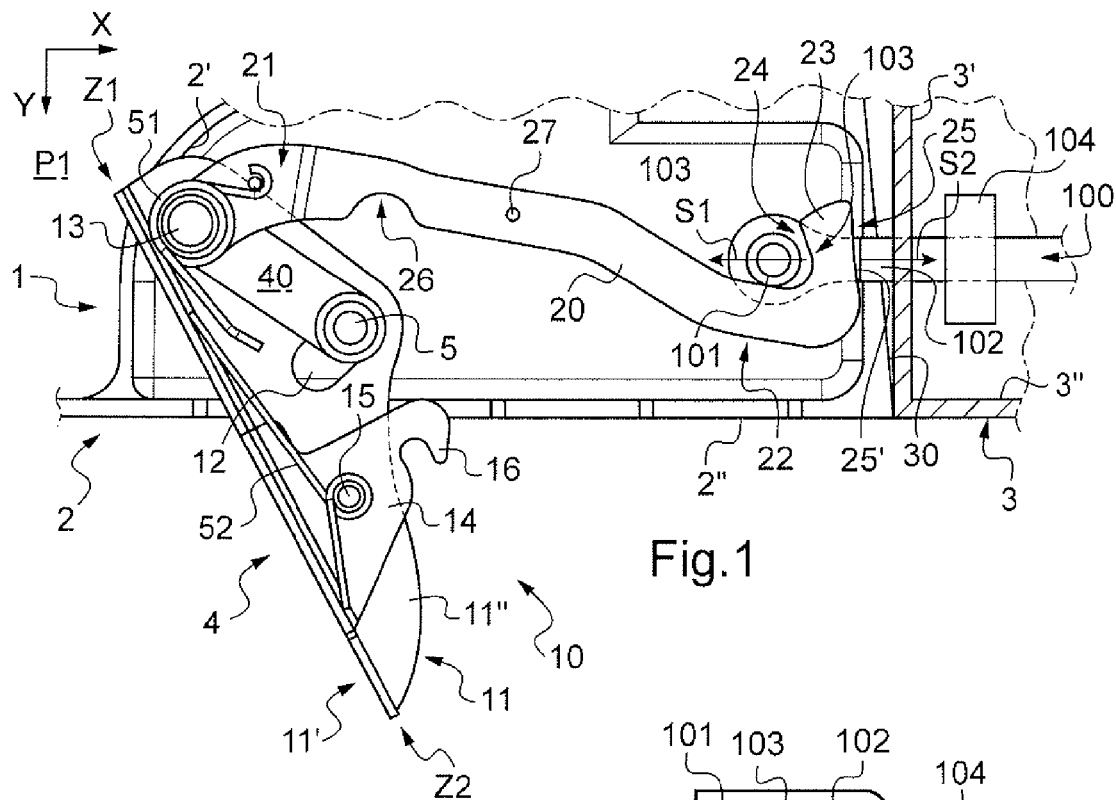
FIG. 1 is a diagrammatic view of an aircraft provided with a locking device of the invention.

FIG. 1 is a diagrammatic view of an aircraft 1, and more particularly of a structural element 2 placed next to an adjacent structure 3.

By way of example, the structural element 2 is a cover 2" perpendicular to a first plane P1 of the sheet containing FIG. 1 and serving to partition a compartment of a rotorcraft, such as an engine compartment. Similarly, the adjacent structure comprises a stationary panel 3" perpendicular to said first plane P1 of the sheet. To close the compartment, the structural element 2 is then pressed against the adjacent structure 3.

The cover 2 is mounted to slide along a longitudinal axis X in order to be placed next to the adjacent structure 3.

In order to be held in position, the aircraft includes a locking device 4 suitable for locking the structural element 2 in position against the adjacent structure 3.

The locking device 4 is provided firstly with a latch 10 fastened to a fastener plate 2' of the structural element 2. By way of example, the fastener plate 2' is perpendicular to the cover 2" and is thus contained in said first plane P1. Secondly the locking device 4 is provided with a retaining pin 100 fastened to a fastener member 3' of the adjacent structure 3, e.g. perpendicular to the stationary panel 3".

Figure 2:
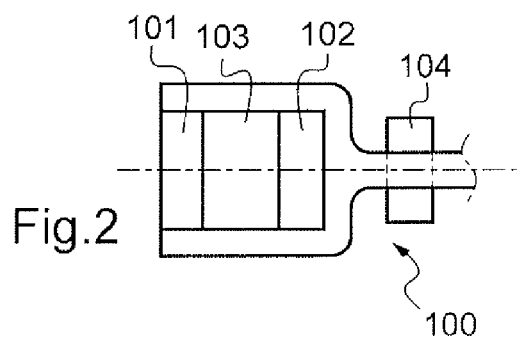
FIG. 2 is a plan view of the retaining pin of the locking device.

With reference to FIG. 2, the retaining pin 100 comprises a first transverse branch 101 and a second transverse branch 102 that are separated by an empty space 103. Furthermore, the retaining pin includes fastener means 104 adjustable to a flat 3' of the adjacent structure, perpendicular to the panel 3. By way of example, reference may be made to Document FR 2 458 656 in order to obtain an embodiment of such fastener means.

With reference to FIG. 1, the latch 10 includes a handle 11 provided with a first plane element 11' suitable for lying flush with the structural element 2 and more particularly with the cover 2", and also a second plane element 11" that is perpendicular to the first plane element 11'.

Under such circumstances, the handle 11 of the latch 10 is provided with an oblong orifice 12 in which there is a fastener sleeve 5 for fastening to at least one support member 2' of the structural element, perpendicular to the cover 2" and parallel to the second plane element 11". Optionally, the latch 10 may be clamped between two support members 2', the fastener sleeve 5 being fastened perpendicularly to the two support members 2'. The handle 11 can then turn about the fastener sleeve 5.

The latch 10 also includes a curved locking arm extending along the longitudinal direction X from a first end 21 towards a second end 22. The first end 21 is then hinged at a first end zone Z1 of the handle 11 by means of a pivot peg 13. A first resilient member 51 of the spring type urges the handle 11 away from the locking arm 20, and more particularly the second end 22 of the locking arm 20 away from a second end zone Z2 of the handle 11.

Furthermore, the handle 11 is fitted with a release catch 14 arranged between the first end zone Z1 and the second end zone Z2 of the handle 11 to prevent the second end zone Z2 from moving away from the second end 22 under drive from the resilient member 51 or as a result of aerodynamic forces.

The release catch 14 is provided with a release hook 16 that co-operates with a catch stud 27 of the locking arm 20, the catch stud 27 extending in a direction parallel to the fastener sleeve 5 between the first end 21 and the second end 22 of the locking arm. Furthermore, the release catch 14 is fastened to the second plane element 11" of the handle via an axis of rotation 15 parallel to the fastener sleeve 5 and to the catch stud 27.

Finally, a second resilient member 52 of the spring type is arranged around the axis of rotation 15 so that the release catch 15 does not project from the first plane element 11' of the handle 11.

When the latch 10 is closed, the release hook 16 engages with the catch stud 27 to prevent the handle 11 tilting relative to the locking arm.

Conversely, when an operator presses on the release catch 14, the release catch 14 turns about the axis of rotation 15. The release hook 16 no longer engages the catch stud 27, thereby giving rise to relative movement between the handle 11 and the locking arm 20.

It should be observed that the locking arm 20 presents a groove 26 between the first end 21 and the second end 22 to avoid interfering with the fastener sleeve 5 when the release hook 16 is engaged on the catch stud 27. Thus, the groove 26 matching the shape of the fastener sleeve 5 serves to improve the compactness of the latch 10.

Furthermore, the second end 22 of the locking arm 20 possess a contact finger 23 extending along a transverse direction Y that is substantially perpendicular to the longitudinal direction X, with the locking arm extending along said longitudinal axis X from its first end 21 towards its second end 22.

The contact finger 23 has a first surface 24 facing the locking arm 20, and more particularly the first end 21 of the locking arm. Thus, the first surface 24 extends in a first direction S1 in which the cover 2" of the structural element 2 extends.

Furthermore, the contact finger has a second surface 25 facing the plane 3' of the adjacent structure. Thus, the second surface 25 is directed along a second direction S2 in which the stationary panel 3" of the adjacent structure 3 extends.

Consequently, the first surface 24 is oppose from the second surface 25, said first surface 24 and said second surface 25 being situated on opposite sides of the contact finger 23. Under such circumstances, the first surface 24 and the second surface 25 constitute opposite flanks of the contact finger 23.

When the contact finger 23 is arranged in the space 103 in the retaining pin 100, the first surface 24 thus faces the first transverse branch 101 so as to be capable of constituting closure means co-operating with said first transverse branch 101, whereas on the contrary the second surface 25 faces the second transverse branch 102 so as to be capable of constituting extractor means co-operating with said second transverse branch 102.

To optimize co-operation between the contact finger 23 and the first transverse branch 101, when required, the first surface 24 is optionally concave, at least in part, so as to be shaped at least in part to match the shape of the first transverse branch 101.

Similarly, in order to optimize co-operation between the contact finger 23 and the second transverse branch 102, when required, the second surface 25 includes a plane portion 25'.

In a variant, the second surface 25 may optionally be at least partially concave so as to be of a shape that matches at least in part the second transverse branch 102.

In another aspect, the locking device 4 is provided with an inclined plane 30 suitable for guiding the contact finger 23 towards the space 103 while the locking device 4 is being locked.

Furthermore, it should be observed that the latch 10 as shown is provided with a single compression link 40 connecting the fastener sleeve 5 to the pivot peg 13.

Thus, when the release hook 16 is engaged with the catch stud 27, the load line of the latch passes via the pivot peg, and the point of contact between the contact finger and the first transverse branch of the retaining pin, but not via the fastener sleeve 5. Conversely, as explained below, after the handle 11 has been released by using the release catch 14, the latch is in an intermediate position in which the load line of the latch passes via the pivot peg, the fastener sleeve 5, and the point of contact. This position prevents the latch opening completely without human intervention. Consequently, unwanted opening of the release catch 14 in flight does not run the risk of leading to the latch opening completely.

FIGS. 3 to 8 together explain the unlocking method implemented by the locking device 4 of the invention.

Figure 3:
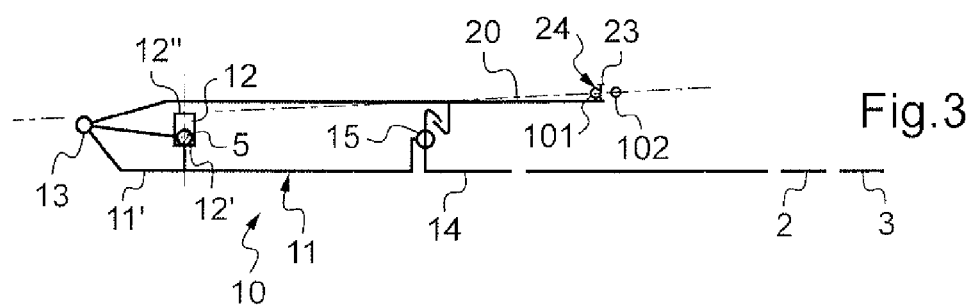

With reference to FIG. 3, when the cover is closed, i.e. when the structural element 2 is pressed against the adjacent structure 3, the handle 11 of the latch 10 is secured to the locking arm 20 by the release catch. The handle 11 is in a position referred to as the "closed" position.

The first surface 24 of the finger 23 co-operates with the first transverse branch 101 of the retaining pin in order to prevent the structural element from moving in translation relative to the adjacent structure 3. Because of its ability to hold the structural element 2 against the adjacent structure 3, the first surface 24 thus constitutes closure means.

Figure 4:
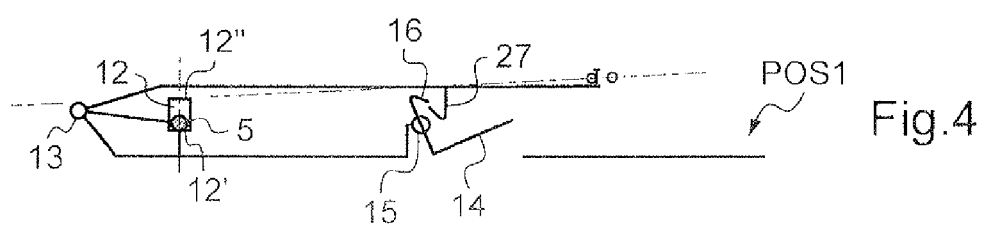

In order to move this structural element in translation, during a first step shown in FIG. 4, an operator acts on the release catch 14 so that it pivots about the axis of rotation 15. The hook 16 no longer co-operates with the catch stud 27 so the handle 11 is separated from the locking arm 20.

It should be observed that the fastener sleeve 5 is at a first end 12' of the oblong hole 12 formed in the handle 11, this oblong hole 12 extending from a first end 12' situated close to a first plane element 11' of the handle 11 towards a second end 12" situated distally relative to said first plane element 11'.

With reference to FIG. 5, release of the handle 11 causes said handle 11 to rotate about the fastener sleeve 11. The fastener sleeve 5 moves and comes into contact with the second end 12" of the oblong orifice 12. The load line of the latch 10 passes via the pivot peg, the fastener sleeve 5, and the point of contact 200 between the contact finger 23 and the first transverse branch 101.

Rotary movement of the handle 11 is then interrupted unless there is human intervention.

During a second step, the operator thus moves the handle 11 to cause it to describe a first angular sector θ1 relative to the closed first position POS1 of the latch 10, drawn in dashed lines. It is recalled that this first position POS1 is reached when the locking device 4 is locked, as shown diagrammatically in FIG. 1.

After traveling through this first angular sector θ1, the first surface 25 is no longer in contact with the first transverse branch 101. In contrast, the second surface 25 of the finger 23 is in contact with the second transverse branch 102. The handle is then in a second position POS2 and the center of the fastener sleeve 5 is then situated in a reference plane AXREF.

In order to extract the structural element 2, starting from the second position POS2 of FIG. 6 and shown in dashed lines in FIG. 7, during a third step the operator continues to move the handle 11 through a second angular sector θ2. Continued turning of the handle 11 gives rise to a longitudinal movement of the locking arm 20.

Consequently, the second surface 25 of the finger 23 pushes against the second transverse branch 102.

Since the adjacent structure 3 secured to the retaining pin 100 is stationary, the latch 10 moves away from the retaining pin 100. The fastener sleeve 5 therefore moves away from the reference plane AXREF through a distance L, e.g. equal to the length of the centering fingers of the structural element 2.

At the end of this second angular sector, the handle 11 is in a third position POS3. Because of its ability to move the structural element 2 away from the adjacent structure 3, the second surface 25 thus constitutes extractor means. For convenience, the term "extraction position" is used to designate the position of the handle going from the second position POS2 to the third position POS3 in which position the second surface is in contact with the second transverse branch.

Finally, with reference to FIG. 8, during a fourth step, the operator moves the handle 11 so as to cause the handle to turn through a third angular sector θ3 relative to the third position POS3 drawn in dashed lines.

During this last movement, the linkage constituted by the latch 10 causes the locking arm to perform a disengaging movement, tending to extract the finger 23 from the space 103.

Starting from the third position POS3, the locking arm bears against the first plane element 11' of the handle 11. Consequently, turning the handle 11 gives rise to corresponding turning of the locking arm 20, thereby enabling the contact finger 23 to be disengaged from the space 103.

The locking device 4 is then unlocked, with the handle being in a position said to be an "open" position.

It should be observed that in order to lock the locking device 4, the above steps are performed going from the fourth step back towards the first step.

Nevertheless, to facilitate insertion of the finger 23 in the space 103, the locking device optionally includes a sloping plane for guiding movement of the finger 23.

Naturally, the present invention may be subjected to numerous variations as to its implementation. Although one embodiment is described, it will readily be understood that it is not conceivable to identify exhaustively all possible embodiments. It is naturally possible to envisage replacing any of the means described by equivalent means without going beyond the ambit of the present invention.

For example, the cover 2 as shown is slidable along a longitudinal axis X in order to be brought next to the structure 3. Nevertheless, the cover 2 could be arranged differently, for example it might rotate about fastener axes without going beyond the ambit of the invention.

What is claimed is:

1. A locking device for locking a structural element to an adjacent structure, the device being provided with a latch suitable for being arranged on said structural element and with a retaining pin suitable for being arranged on said adjacent structure, said latch comprising firstly a handle having an oblong orifice in which there is inserted a fastener sleeve fastening it to said structural element, and secondly a locking arm having a first end hinged to said handle via a pivot peg, said handle including a release catch suitable for preventing said handle from tilting relative to said locking arm, wherein said retaining pin has first and second transverse branches that are separated by a space, a second end of said locking arm has a contact finger having on either side a first surface facing said first end and a second surface opposite from said first surface, said first surface constituting closure means that co-operate with said first transverse branch to lock said locking device, said second surface constituting extractor means for extracting said latch that co-operate with said second transverse branch to move the latch longitudinally away from the retaining pin, said contact finger then being outside said space so as to unlock said locking device, said second surface having a plane portion suitable for being in contact with said second transverse branch, wherein said release catch moves to separate said handle from said locking arm, wherein said handle moves through a first angular sector (θ1) such that said plane portion of the second surface is pressed against said second transverse branch, wherein said handle moves through a second angular sector (θ2) such that said second surface exerts a force on said second transverse branch and moves said structural element away from said adjacent structure, and wherein said handle moves through a third angular sector (θ3) such that said contact finger is extracted from said space.

2. The device according to claim 1, including an inclined plane suitable for guiding said contact finger towards said space while said device is being locked.

3. The device according to claim 1, wherein said locking arm includes a groove co-operating with said fastener sleeve.

4. The device according to claim 1, wherein said latch includes a compression link connecting said sleeve to said pivot peg.

5. The device according to claim 1, wherein the locking arm includes a catch stud between a first end and a second end of said locking arm, and said release catch co-operates with said catch stud of said locking arm to prevent the handle from tilting when said device is locked.

6. An aircraft provided with a structural element for fastening to an adjacent structure using at least one locking device, the locking device being provided with a latch arranged on said structural element and with a retaining pin arranged on said adjacent structure, said latch comprising firstly a handle having an oblong orifice in which there is inserted a fastener sleeve fastening it to said structural element, and secondly a locking arm having a first end hinged to said handle via a pivot peg, said handle including a release catch suitable for preventing said handle from tilting relative to said locking arm, said retaining pin having first and second transverse branches that are separated by a space, said locking arm having a contact finger with a first surface facing said first end and an opposed second surface having a plane portion suitable for being in contact with said second transverse branch, said first surface configured to be closure means that co-operate with said first transverse branch to lock the locking device, said second surface configured to be extractor means that co-operate with said second transverse branch to move the latch longitudinally away from the retaining pin for extracting said latch, wherein said release catch moves to separate said handle from said locking arm, wherein said handle moves through a first angular sector ($\theta 1$) such that said plane portion of the second surface is pressed against said second transverse branch, wherein said handle moves through a second angular sector ($\theta 2$) such that said second surface exerts a force on said second transverse branch and moves said structural element away from said adjacent structure, and wherein said handle moves through a third angular sector ($\theta 3$) such that said contact finger is extracted from said space.

7. A method of unlocking a structural element fastened to an adjacent structure by at least one locking device provided with a latch arranged on said structural element and a retaining pin arranged on said adjacent structure, said latch comprising firstly a handle having an oblong orifice in which there is inserted a fastener sleeve fastening it to said structural element, and secondly a locking arm having a first end hinged to said handle via a pivot peg, said handle including a release catch suitable for preventing said handle from tilting relative to said locking arm, said retaining pin comprising first and second transverse branches that are separated by a space, a second end of said locking arm including a contact finger having on either side a first surface facing said first end and a second surface with a planar section opposite from said first surface, the planar section suitable for being in contact with said second transverse branch, said first surface constituting closure means that co-operate with said first transverse branch to lock said locking device, said second surface constituting extractor means for extracting said latch that co-operate with said second transverse branch to move the latch longitudinally away from the retaining pin, said contact finger then being outside said space so as to unlock said locking device, the method comprising the following steps:

moving said release catch to separate said handle from said locking arm;

moving said handle through a first angular sector ($\theta 1$) to press said planar section of the second surface against said second transverse branch;

moving said handle through a second angular sector ($\theta 2$) so that said second surface exerts a force on said second transverse branch in order to move said structural element away from said adjacent structure; and moving said handle through a third angular sector ($\theta 3$) so as to extract said contact finger from said space.

8. The device according to claim 1 wherein said second surface constituting extractor means for extracting said latch that co-operate with said second transverse branch to move the latch and the structural element longitudinally away from the retaining pin and the adjacent structure.

9. The aircraft of claim 6 wherein said second surface is further configured to co-operate with said second transverse branch to move the structural element longitudinally away from the retaining pin and the adjacent structure for extracting said latch.

10. The locking device of claim 2 wherein the inclined plane has a generally planar surface configured to co-operate with the second surface of the locking arm to guide the contact finger towards the space of the retaining pin in preparation for locking said locking device, the inclined plane extending in an inboard direction from an outer surface of the adjacent structure past the retaining pin, the inclined plane intersecting the second retaining pin, wherein a distance between the surface of the inclined plane and the adjacent structure increases in the inboard direction.

11. The locking device of claim 1 wherein the space of the retaining pin is defined as a rectangular shape with the first and second transverse branches forming opposed, generally parallel sides of the space.

12. The method of claim 7 wherein moving said handle through a second angular sector ($\theta 2$) causes a single force to be imparted from the locking arm to the retaining pin along the longitudinal axis of the locking arm.

13. The method of claim 7 wherein the handle forms an acute angle with the locking arm at a beginning of the second angular sector; and wherein the handle forms an obtuse angle with the locking arm at an end of the second angular sector.

* * * * *